May 15, 1928.
F. ALBACH
1,670,277
LATCHING AND LOCKING MECHANISM
Filed Jan. 24, 1927
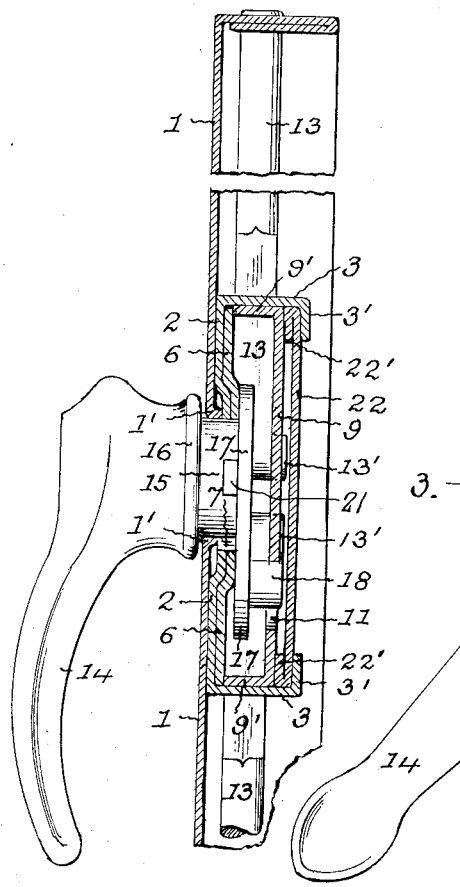
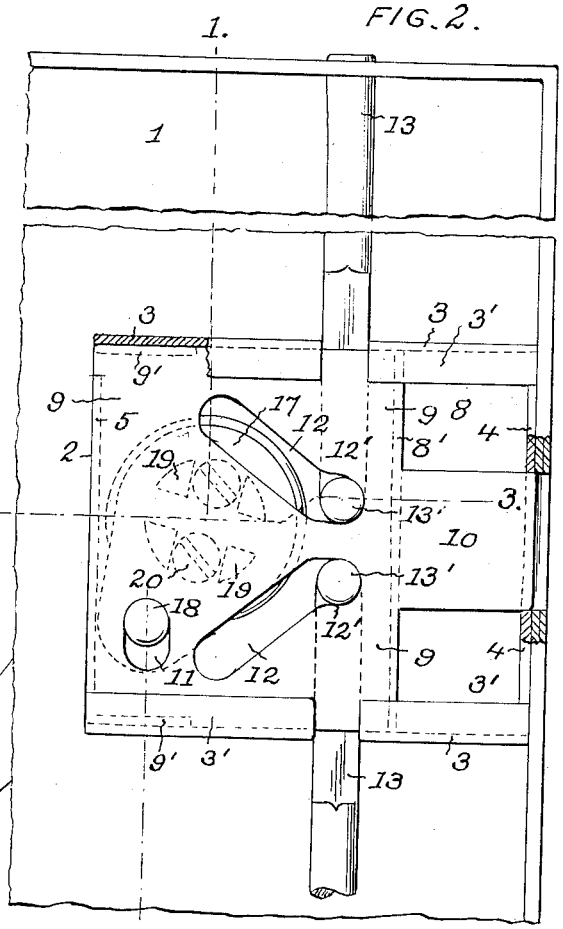
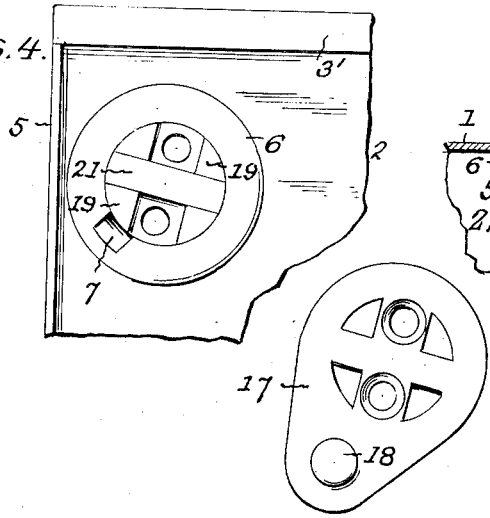
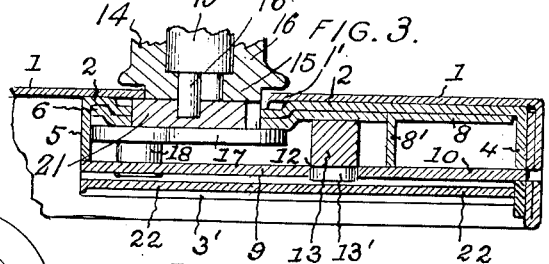
INVENTOR:
FRANK ALBACH,
BY Robert Burns
ATTORNEY.

Patented May 15, 1928.

1,670,277

UNITED STATES PATENT OFFICE.

FRANK ALBACH, OF ST. LOUIS, MISSOURI, ASSIGNOR TO FRED MEDART MANUFACTURING COMPANY, OF ST. LOUIS, MISSOURI, A CORPORATION OF MISSOURI.

LATCHING AND LOCKING MECHANISM.

Application filed January 24, 1927. Serial No. 163,169.

This invention relates to that type of multiple bolt latch and lock mechanisms for plate metal club lockers, cabinets and the like, and has for its various objects:

To provide a structural formation and combination of the plate metal parts of the bolt operating mechanism of a club locker or the like, whereby the multiple bolts of the mechanism are operated in unison in a ready and effective manner, with said bolts effectively held against a normal tendency to move by gravity stress from a fully engaged to a partially disengaged condition.

To provide a structural formation and association of parts, wherein the journal hub of the operating handle is formed with an axial bore for the reception of a cylinder lock mechanism, and is revolubly mounted in the enclosing casing of a multiple bolt operating mechanism, in a substantial manner, the bearing in said casing for the hub of the operating handle being provided with a provision for locking engagement with the usual transverse bolt of the aforesaid cylinder lock mechanism, to effectively secure the various moving parts of the mechanisms in their engaged positions, all as will hereinafter more fully appear.

In the accompanying drawing:

Fig. 1, is a vertical section on line 1—1, Fig. 2, of a combined latching and locking mechanism embodying the present invention, showing its application to the marginally flanged plate metal door of a club locker.

Fig. 2, is a rear elevation of the mechanism, with the rear cover plate removed and with parts shown in section.

Fig. 3, is a horizontal section of the mechanism on line 3—3, Fig. 2.

Fig. 4, is a detail rear elevation of a portion of the enclosing case of the bolt operating mechanism with the journal hub of the operating handle in place, the operating crank arm of said mechanism being removed to disclose the slidingly mounted transverse locking bolt of a cylinder lock mechanism arranged in the handle hub as well as showing the locking notch or recess in which said locking bolt has engagement.

Fig. 5, is a rear elevation of the operating crank arm of the bolt operating mechanism in a detached condition.

Like reference numerals indicate like parts in the several views.

The locker or like door 1, in the construction shown is of the marginally flanged plate metal type, the upper and lower flanges of which are formed with guide orifices for the upper and lower vertically arranged bolts of the present multiple bolt operating mechanism.

The enclosing casing of such operating mechanism is of a plate metal formation, in which a suitably formed blank is bent and folded to provide a flat main web or wall 2 formed with a circular orifice, reinforced in the manner hereinafter described, to provide a bearing for the journal hub of the hereinafter described operating handle of the mechanism. At its upper and and lower edges, the web 2 carries integrally formed and angularly arranged flanges or walls 3, with the free ends of each flange or wall formed with a subflange 3' for confining engagement with the hereinafter described cover plate of the mechanism. In addition the flanges or walls 3 are cut away to provide guide channels for the respective upper and lower vertical bolts of the mechanism, as illustrated in Fig. 2.

At its forward side the main web or wall 2, carries a vertical flange or wall 4 in which is formed a guide orifice having guiding engagement with the locking tongue of the hereinafter described cam plate of the mechanism, and in the construction shown in Figs. 2 and 3, the adjacent reinforcing flange of the door 1 is formed with a guide orifice in alined relation to the guide orifice of the flange 4, with the wall 2 and its flange 4 constituting means whereby the enclosing casing of the mechanism is attached in place on the inner side of the door 1 by ordinary spot welds or other usual attaching means.

At its rearward end the main web or wall 2 carries a vertical flange or wall 5 the edge of which provides a guide and bearing for the rearward end of the cam plate above referred to.

In the rearward portion of the interior of the enclosing casing, a reinforcing member 6 of plate metal is attached to the main web or wall 2 of the casing and is formed with a circular orifice complementary to the above described circular orifice in the web or wall 2, and in the preferred construction as shown, the material of said web or wall 2, and of the reinforcing plate 6, adjacent to said orifices are displaced inwardly as shown to provide a receiving space for the inturned marginal flange 1' of an orifice formed in the door 1 in aligned relation with the orifices just described. The described construction is adapted to provide an extended and substantial bearing for the journal hub of the operating handle of the mechanism, and a like extended bearing in a receiving recess 7 in the margins of the aforesaid orifices of the web 2 and plate 6, into which recess 7, the hereinafter described transverse bolt of a cylinder lock mechanism is adapted to have engagement.

In the forward portion of the interior of the enclosing casing, an angular plate metal member 8 is secured with its main web attached to the main web or wall 2 of the casing, and its flange 8' forming a bearing or support for cam plate above referred to, and at the midlength of said plate.

The operating cam plate or member 9 of the bolt operating mechanism above referred to, is of a flat plate metal formation having a latching tongue 10 at its forward end adapted to move in the aforesaid guide orifice of the flange or wall 4 of the casing and in an aligned orifice in an adjacent marginal flange of the door 1, with the free end of said tongue adapted to engage in a receiving recess of the door frame of the door 1.

The proper position of the cam plate 9 during its movements is maintained by the aforesaid flanges 5 and 8' of the enclosing casing in connection with the hereinafter described cover plate of said casing and flanges 9' formed on the rear portion of the cam plate 9 and having sliding engagement on the reinforcing plate 6 as shown in Fig. 1.

The cam plate 9 is also formed with a vertically elongated slot 11 near one corner for operative engagement with the crank pin of the operating arm hereinafter described, and with a pair of oppositely extending cam slots 12, each of which is individual to a vertical bolt 13 of the mechanism, and to such end has operative engagement with a lateral stud 13' on the end of each upper and lower bolt 13 of the mechanism. In the preferred construction shown in Fig. 2, the inclined cam slots 12, near their adjacent ends, are formed with horizontal extensions 12' in which the aforesaid studs 13' of the bolts 13 have entry in an open condition of the mechanism and are supported against a gravity stress of the lower one of the bolts 13 to resist a tendency of said bolt to move the mechanism from a fully opened and proper position.

The upper and lower vertically arranged bolts 13, above referred to, are preferably formed with cylindrical outer portions having sliding engagement in guide orifices in the upper and lower flanges of the door 1, and with inner squared portions having sliding engagement in the before mentioned guide passages of the enclosing casing of the bolt operating mechanism, with the adjacent ends of such inner squared portions of the bolts carrying the aforesaid lateral studs 13' in operative engagement with the cam slots 12 of the cam plate 9. Said parts are held in operative engagement by a sliding fit between the squared portions of the bolts 13 and the cam plate 9 and the reenforcing plate 6, as shown in Fig. 3.

The operating handle 14, is preferably of the lever or lateral arm type shown, with its body portion formed with a reduced cylindrical journal hub 15 adapted to fit and have turning movement in the heretofore described aligned orifices in the door 1, web 2 and reinforcing plate 6 of the enclosing casing of the bolt operating mechanism. In the construction shown, the handle hub 15 is held from longitudinal movement by the annular shoulder 16 of the body portion of the handle 14, and at the rear end by the hub portion of the operating crank arm 17, which as shown, carries the crank pin 18 in operative engagement with the elongated slot 11 of the cam plate 9 to impart reciprocation to said cam plate.

The hub portion of the crank arm 17 is fixed on the rear end of the handle hub 15 in a detachable manner and preferably by a plurality of eccentrically arranged studs 19 on the hub 15 engaging in corresponding orifices in the hub portion of said crank arm and held in place by one or more screws 20 as shown.

In the preferred form of the invention, the body portion and cylindrical bearing hub 15 of the operating handle 14 are formed with an axial bore adapted to receive and house any usual and suitable type of cylinder lock mechanism, with the revoluble barrel 19' of said cylinder lock mechanism having operative connection with a transversely sliding bolt 21 moving in a guideway in the rear end of the journal hub 15 of the handle 14 by means of an eccentrically arranged stud 16' on the inner end of the barrel 19' engaging in a cross slot formed at the mid-length of the bolt 21 as shown in Fig. 4. In the described construction the sliding bolt 21 is adapted to engage in the heretofore described marginal recess 7 of the bearing orifices in the web 2 and reinforcing plate 6 of the enclosing casing of the bolt operating mechanism, to lock the operating handle 14 and its parts against a turning movement.

The cover plate 22 heretofore referred to is formed of plate metal and is adapted to slide into place beneath the subflanges 3' of the flanges 3 of the main web 2 of the enclosing casing of the bolt operating mechanism. At its upper and lower edges said cover plate is formed with folds 22' which have bearing against the rearward face of the cam plate 9 to maintain the parts in proper position in the movements of the cam plate.

Having thus fully described my invention, what I claim and desire to secure by Letters Patent, is:—

1. In a bolt operating mechanism for doors, the combination of a reciprocable plate formed with a vertically elongated slot, with an end latching tongue and with guide flanges at opposed sides, a plate metal enclosing casing formed with a journal orifice and with guide flanges at opposed edges providing confining means for said plate in its reciprocation, an operating handle provided with cylindrical hub having journal support in the journal orifice of the casing, and a crank arm attached to the rear end of the handle hub and provided with a crank pin in operative engagement with the elongated slot of said reciprocable plate.

2. In a bolt operating mechanism for doors, the combination of a reciprocable plate formed with a vertically elongated slot, with an end latching tongue and with guide flanges at opposed sides, a plate metal enclosing casing formed with a journal orifice and with guide flanges at opposed edges providing confining means for said plate in its reciprocation, a reinforcing plate secured in the interior of said casing and formed with an orifice in aligned relation and supplementary to said orifice in the casing, an operating handle provided with a cylindrical hub having journal support in the aforesaid orifices, and a crank arm attached to the rear end of the handle hub and provided with a crank pin in operative engagement with the elongated slot of said reciprocable plate.

3. In a bolt operating mechanism for doors, the combination of a reciprocable plate formed with a vertically elongated slot, with an end latching tongue and with guide flanges at opposed sides, a plate metal enclosing casing formed with a journal orifice and with guide flanges at opposed edges providing confining means for said plate in its reciprocation, a reinforcing plate secured in the interior of said casing and formed with an orifice in aligned relation and supplementary to said orifice in the casing, the material of the casing and reinforcing plate adjacent to and encircling said orifices being displaced inwardly of the casing to provide space for an inturned annular flange on a door, an operating handle provided with a cylindrical hub having journal support in the aforesaid orifices, and a crank arm attached to the rear end of the handle hub and provided with a crank pin in operative engagement with the elongated slot of said reciprocable plate.

4. In a bolt operating mechanism for doors, the combination of a reciprocable plate formed with a vertically elongated slot, with an end latching tongue and with guide flanges at opposed sides, a plate metal enclosing casing formed with a journal orifice, and with flanges at its forward, rearward, upper and lower ends, the forward flange being formed with a guide orifice for the latching tongue of the reciprocable plate, the rearward flange forming a guide for the rearward portion of said plate and the upper and lower flanges providing confining means for said plate, an operating handle provided with a cylindrical hub having journal support in the orifice of the casing, and a crank arm attached to the rear end of the handle hub and provided with a crank pin in operative engagement with the elongated slot of said reciprocable plate.

5. In a bolt operating mechanism for doors, the combination of a reciprocable plate formed with a vertically elongated slot, with an end latching tongue and with guide flanges at opposed sides, a plate metal enclosing casing formed with a journal orifice, and with flanges at its forward, rearward, upper and lower ends, the forward flange being formed with a guide orifice for the latching tongue of the reciprocable plate, the rearward flange forming a guide for the rearward portion of said plate and the upper and lower flanges providing confining means for said plate, a reinforcing plate secured in the interior of the casing and formed with an orifice in aligned relation and supplementary to said orifice in the casing, an operating handle provided with a cylindrical hub having journal support in the aforesaid orifices, and a crank arm attached to the rear end of the handle hub and provided with a crank pin in operative engagement with the elongated slot of said reciprocable plate.

6. In a bolt operating mechanism for doors, the combination of a reciprocable plate formed with a vertically elongated slot, with an end latching tongue and with guide flanges at opposed sides, a plate metal enclosing casing formed with a journal orifice, and with flanges at its forward, rearward, upper and lower ends, the forward flange being formed with a guide orifice for the latching tongue of the reciprocable plate, the rearward flange forming a guide for the rearward portion of said plate and the upper and lower flanges providing confining means for said plates, a reinforcing plate secured in the interior of the casing and formed with an orifice in aligned relation and supplementary to said orifice in the casing, the material of the casing and reinforcing plate adjacent to and encircling said orifices being displaced inwardly of the casing to provide space for an inturned annular flange of a door, an operating handle provided with a cylindrical hub having journal support in the aforesaid orifices, and a crank arm attached to the rear end of the handle hub and provided with a crank pin in operative engagement with the elongated slot of said reciprocable plate.

7. In a bolt operating mechanism for doors, the combination of a reciprocable plate formed with a vertically elongated slot, with an end latching tongue and with guide flanges at opposed sides, a plate metal enclosing casing formed with a journal orifice, and with flanges at its forward, rearward, upper and lower ends, the forward flange being formed with a guide orifice for the latching tongue of the reciprocable plate, the rearward flange forming a guide for the rearward portion of said plate and the upper and lower flanges providing confining means for said plate, an angle plate secured in the forward portion of the casing with its flange providing a bearing for a forward portion of the reciprocable plate, an operating handle provided with a cylindrical hub having journal support in the orifice of the casing, and a crank arm attached to the rear end of the handle hub and provided with a crank pin in operative engagement with the elongated slot of said reciprocable plate.

8. In a bolt operating mechanism for doors, the combination of a reciprocable plate formed with a vertically elongated slot, with an end latching tongue and with guide flanges at opposed sides, a plate metal enclosing casing formed with a journal orifice, and with flanges at its forward, rearward, upper and lower ends, the forward flange being formed with a guide orifice for the latching tongue of the reciprocable plate, the rearward flange forming a guide for the rearward portion of said plate, a removable cover plate fitting beneath the upper and lower flanges of the casing and having folded upper and lower edges for bearing against the reciprocable plate aforesaid, an operating handle provided with a cylindrical hub having journal support in the orifice of the casing, and a crank arm attached to the rear end of the handle hub and provided with a crank pin in operative engagement with the elongated slot of said reciprocable plate.

9. In a bolt operating mechanism for doors, the combination of a reciprocable plate formed with a vertically elongated slot, with an end latching tongue and with guide flanges at opposed sides, a plate metal enclosing casing formed with a journal orifice, and with flanges at its forward, rearward, upper and lower ends, the forward flange being formed with a guide orifice for the latching tongue of the reciprocable plate, the rearward flange forming a guide for the rearward portion of said plate, an angle plate secured in the forward portion of the casing with its flange providing a bearing for a forward portion of the reciprocable plate, a removable cover plate fitting beneath the upper and lower flanges of the casing and having upper and lower folded edges for bearing against the reciprocable plate aforesaid, an operating handle provided with a cylindrical hub having journal support in the orifice of the casing, and a crank arm attached to the rear end of the handle hub and provided with a crank pin in operative engagement with the elongated slot of said reciprocable plate.

10. In a combined latching and locking mechanism for doors, the combination of a reciprocable latching plate provided with a vertically elongated slot, an enclosing casing provided with guiding means for said plate, and with a journal orifice, the margin of which orifice is formed with a receiving recess, an operating handle formed with a cylindrical hub having journal support in the orifice of the casing, the hub and main body of the handle having an axial bore adapted to receive a cylinder lock mechanism, a transverse bolt slidingly mounted in the rear end of said hub and adapted for locking engagement with the marginal recess of the journal orifice of the casing and operative engagement with the cylinder lock mechanism, and a crank arm attached to the rear end of the handle hub and provided with a crank pin in operative engagement with the elongated slot of the aforesaid latching plate.

11. In a combined latching and locking mechanism for doors, the combination of a reciprocable latching plate provided with a vertically elongated slot, an enclosing casing provided with guiding means for said plate, and with a journal orifice, the margin of which orifice is formed with a receiving recess, a reinforcing plate secured in said casing and having a journal orifice in aligned relation with the journal orifice of the casing, the margins of said orifices being formed with a receiving recess, an operating handle formed with a cylindrical hub having journal support in said orifices, the hub and main body of the handle having an axial bore adapted to receive a cylinder lock mechanism, a transverse bolt slidingly mounted in the rear end of said hub and adapted for locking engagement with the marginal recess of the aforesaid journal orifices and operative engagement with the cylinder lock mechanism, and a crank arm attached to the rear end of the handle hub and provided with a crank pin in operative engagement with the elongated slot of the aforesaid latching plate.

12. In a combined latching and locking mechanism for doors, the combination of a reciprocable latching plate provided with a vertically elongated slot and a pair of oppositely extending cam slots, an enclosing casing provided with guiding means for said plate and with a journal orifice, the margin of which orifice is formed with a receiving recess, an operating handle formed with a cylindrical hub having journal support in the journal orifice of the casing, the hub and main body of the handle having an axial bore adapted to receive a cylinder lock mechanism, a transverse bolt slidingly mounted in the rear end of said hub and adapted for locking engagement with the marginal recess of the journal orifice of the casing and operative engagement with the cylinder lock mechanism a crank arm attached to the rear end of the handle hub and provided with a crank pin in operative engagement with the elongated slot of said latching plate, and upper and lower sliding bolts guided in said casing and carrying lateral studs in operative engagement with the cam slots of the aforesaid latching plate.

13. In a combined latching and locking mechanism for doors, the combination of a reciprocable latching plate provided with a vertically elongated slot and a pair of oppositely extending cam slots, an enclosing casing provided with guiding means for said plate and with a journal orifice, the margin of which orifice is formed with a receiving recess, a reinforcing plate secured in the interior of the casing and formed with an orifice in aligned relation and supplementary to the orifice in the casing, an operating handle formed with a cylindrical hub having journal support in the aforesaid journal orifices, the hub and main body of the handle having an axial bore adapted to receive a cylinder lock mechanism, a transverse bolt slidingly mounted in the rear end of said hub and adapted for locking engagement with the marginal recess of the journal orifices and operative engagement with the cylinder lock mechanism, a crank arm attached to the rear end of the handle hub and provided with a crank pin in operative engagement with the elongated slot of said latching plate, and upper and lower sliding bolts guided in said casing and carrying lateral studs in operative engagement with the cam slots of the aforesaid latching plate.

14. In a combined latching and locking mechanism for doors, the combination of a reciprocable latching plate provided with a vertically elongated slot and a pair of oppositely extending cam slots, an enclosing casing provided with guiding means for said plate and with a journal orifice, the margin of which orifice is formed with a receiving recess, an operating handle formed with a cylindrical hub having journal support in the journal orifice of the casing, the hub and main body of the handle having an axial bore adapted to receive a cylinder lock mechanism, a transverse bolt slidingly mounted in the rear end of said hub and adapted for locking engagement with the marginal recess of the journal orifice of the casing, and operative engagement with the cylinder lock mechanism, a crank arm attached to the rear end of the handle hub and provided with a crank pin in operative engagement with the elongated slot of said latching plate, a removable cover plate fitting the rearward side of the casing and having folded upper and lower edges for bearing against the latching plate aforesaid, and upper and lower sliding bolts guided in said casing and carrying lateral studs in operative engagement with the cam slots of the aforesaid latching plate.

Signed at St. Louis, Missouri, this 20th day of January, 1927.

FRANK ALBACH.